United States Patent
Ratasuk et al.

(10) Patent No.: US 7,599,320 B2
(45) Date of Patent: Oct. 6, 2009

(54) ENHANCED-TRANSPORT FORMAT COMBINATION POWER MARGIN FOR UPLINK

(75) Inventors: Rapeepat Ratasuk, Hoffman Estates, IL (US); Amitava Ghosh, Buffalo Grove, IL (US); Weimin Xiao, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 518 days.

(21) Appl. No.: 11/485,899

(22) Filed: Jul. 13, 2006

(65) Prior Publication Data

US 2008/0013499 A1    Jan. 17, 2008

(51) Int. Cl.
*H04B 7/185* (2006.01)

(52) U.S. Cl. .................. 370/318; 370/320; 370/335; 370/338; 370/342; 455/522

(58) Field of Classification Search .......... 370/318, 370/320, 335, 338, 342; 455/522
See application file for complete search history.

(56) References Cited

U.S. PATENT DOCUMENTS

2005/0043052 A1    2/2005    Whinnett et al.

2006/0056355 A1    3/2006    Love et al.
2007/0177536 A1*   8/2007    Brueck et al. ............... 370/328

FOREIGN PATENT DOCUMENTS

| EP | 1 341 318 A2 | 9/2003 |
| EP | 1 494 366 A1 | 1/2005 |
| EP | 1 564 905 A2 | 8/2005 |

OTHER PUBLICATIONS

International Search Report and Written Opinion of the International Searching Authority, International Patent Application No. PCT/US2007/071281, mailed Feb. 26, 2008 (11 pages).

* cited by examiner

*Primary Examiner*—Nghi H Ly
(74) *Attorney, Agent, or Firm*—Brinks Hofer Gilson & Lione; John G. Rauch; Nathan O. Greene (57) ABSTRACT

A communications network (200) for enhanced uplink of High-Speed Uplink Packet Access (HSUPA) in 3G wireless communications includes a mobile transceiver unit (605). The mobile transceiver unit is operable to use a channel prediction to estimate a power margin of one or more dedicated channels, predict a power margin for an acknowledgement transmission based on transmission parameters, reserve a power margin for a channel quality indicator (CQI) transmission, and determine an Enhanced Transport Format Combination (E-TFC) for an uplink data packet transmission based on an available power margin. The communications network also includes a communications network node (610) operable to transmit a power control signal to the mobile transceiver unit.

29 Claims, 10 Drawing Sheets

Fig. 10 ns network.

ENHANCED-TRANSPORT FORMAT COMBINATION POWER MARGIN FOR UPLINK

BACKGROUND

The invention relates to a Wideband Code Division Multiple Access (WCDMA) communications systems. In particular, the invention relates to power margin management in WCDMA communications systems.

High Speed Packet Access (HSPA) is a concept within Wideband Code Division Multiple Access (WCDMA) specifications, such as Universal Mobile Communication System (UMTS), which is under the Third Generation Partnership Project (3GPP) of the European Telecommunication Standards Institute (ETSI). The main target of HSPA is to improve system capacity and throughput while reducing delay.

Within the HSPA concept, two distinct but related specifications have been standardized—High Speed Downlink Packet Access (HSDPA) and High Speed Uplink Packet Access (HSUPA). HSDPA introduces new channels and features to enable high-speed packet access in the downlink direction. While connected, a user equipment (UE) periodically sends a Channel Quality Indicator (CQI) to a network node, or Node-B, indicating what downlink data rate the user equipment can support under its current radio conditions. The UE also sends an acknowledgement (Ack/Nack) for each packet such that the Node-B knows when to initiate retransmissions. With the channel quality measurements available for each user equipment in the cell, the packet scheduler may optimize its scheduling among the users.

The HSDPA concept also introduces an additional high-speed dedicated physical control channel (HS-DPCCH) in the uplink for carrying the CQI information as well as the high speed acknowledgement H-ARQ acknowledgements. Similarly, HSUPA introduces new channels and features to enable high-speed packet access in the uplink direction. Within HSUPA, two uplink dedicated channels were introduced, namely the Enhanced Dedicated Physical Data Channel (E-DPDCH) and the Enhanced Dedicated Physical Control Channel (E-DPCCH). These two channels carry the high-speed uplink packet data transmission and associated control information, respectively.

DETAILED DESCRIPTION

UMTS is based on CDMA radio access technology. In CDMA communication systems, uplink and downlink control or data channels typically use a large bandwidth of radio frequency spectrum, for example in the range of 5 MHz for UMTS channels.

In CDMA communication systems, signaling and/or traffic data is multiplied by a respective code prior to being transmitted on uplink or downlink control or data channels. The multiplication spreads the original data over a wide bandwidth. At the receiver, the received wideband signal is multiplied by the same code that was used in the transmitter, recovering the original signaling or traffic data.

Separation between different channels is achieved by allocating a different code to each channel. Such channels are called code channels. Since different codes are used for different code channels, different code channels may be kept distinct from each other even though they are transmitted using the same radio frequency spectrum.

Signal power may change over time for an uplink traffic channel, and an associated uplink signaling channel, namely the Dedicated Physical Data Channel (DPDCH) and the Dedicated Physical Control Channel (DPCCH) defined for UMTS. A gain factor is applied to the DPDCH and a gain factor is applied to the DPCCH.

Specifically in UMTS a set of Transport Format Combinations (TFC) are defined for the UE to use, the TFCs defining information relating to data rate for transmission of data on the DPDCH and gain factors for the DPDCH and the DPCCH. In each radio frame the UE selects a TFC, and signals on the DPCCH to inform the node B of the selected TFC. In addition, after applying the gain factors, the transmit power of the DPDCH and the DPCCH are scaled by the UE such that the DPCCH output power follows the changes required by the power control process. In HSUPA, the Enhanced Transport Format Combination (E-TFC) signals the selected instantaneous data rate for a packet transmission.

Figure 1:
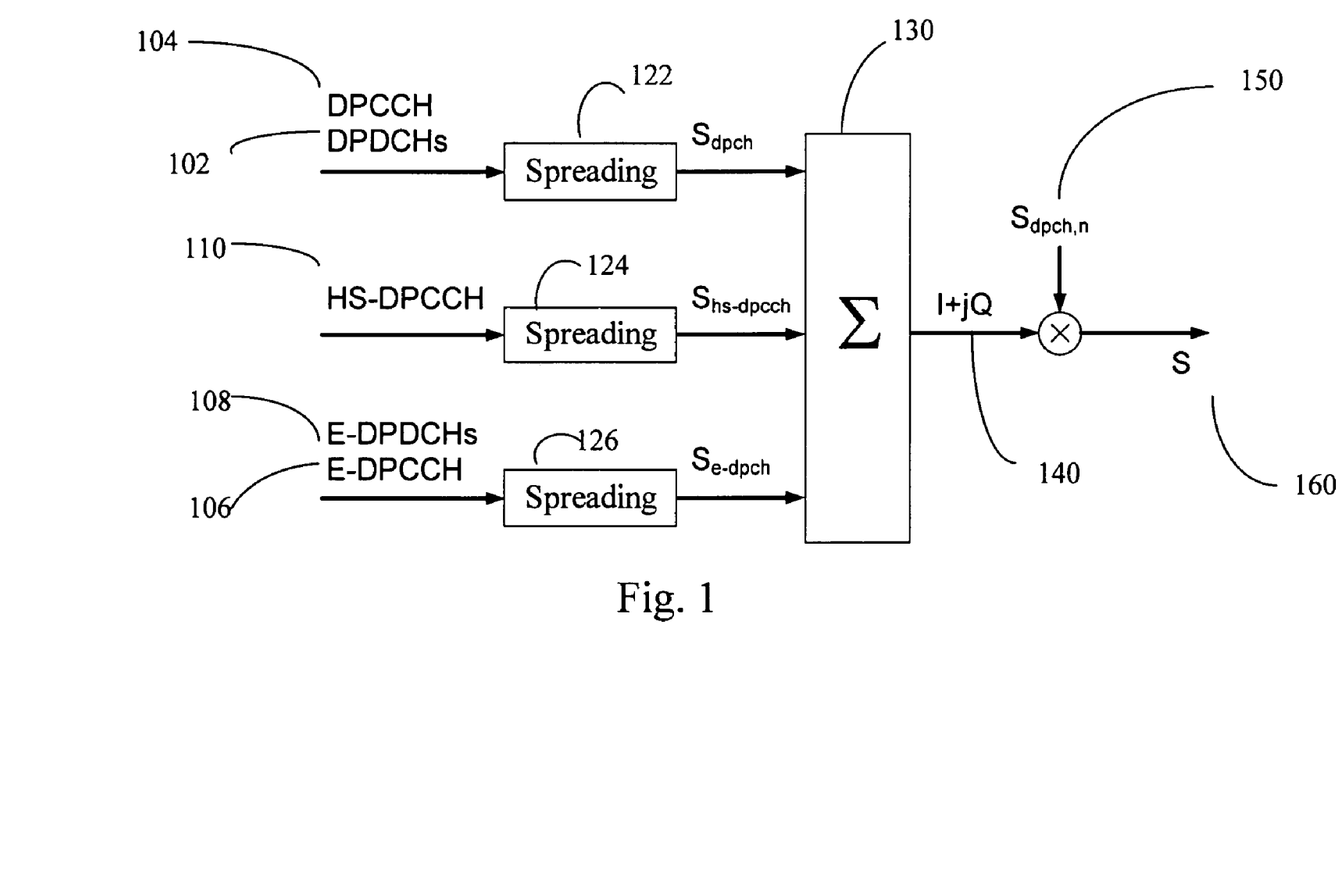
FIG. 1 illustrates spreading for uplink dedicated channels.

FIG. 1 illustrates a transmitter circuit portion including the uplink channels that may be transmitted by the UE. The uplink channels include: a DPDCH 102 that carries circuit data; a DPCCH 104, which is a control channel associated with DPDCH; an enhanced (E)-DPDCH 106 that carries packet data and is a new (additional) channel introduced by HSUPA; an enhanced (E)-DPCCH 108 control channel associated with the E-DPDCH; and an HS-DPCCH 110 control channel to support HSDPA operation in the downlink. The HS-DPCCH carries the ACK and CQI. The TFC is associated with DPDCH and the E-TFC is associated with the E-DPDCH.

Spreading modules 122, 124, and 126 provide the code channel and gain factors before summation in a summing module 130. An in-phase and a quadrature operation 140 is performed on the summed signal before multiplication by the DPCH signal at a multiplier 150 to produce the spread signal 160.

The uplink traffic channel and the uplink signaling channel are CDMA code channels and are used by a user device to transmit traffic data and associated signaling information to a base station (called a Node B in UMTS terminology). The terms UE and node B will be used hereafter to refer to the user terminal and the base station; however, the following description may relate to other communication systems, and is not limited to UMTS. Thus the uplink DPDCH carries the traffic data being transmitted from the UE to the node B and the uplink DPCCH carries the associated control information.

The uplink DPDCH carries the traffic data transmitted from the UE to the Node B. UMTS provides that the data rate used by the UE on the uplink may vary between frames or sub-frames. The current UMTS standards only allow the data rate to vary on a Transmission Time Interval (TTI) basis, where a TTI can comprise one to four 10 ms frames. In addition, the gain factor (and thus the power offset between DPDCH and DPCCH) used to transmit the traffic data may vary according to the data rate at which the traffic data is to be transmitted.

Figure 2:
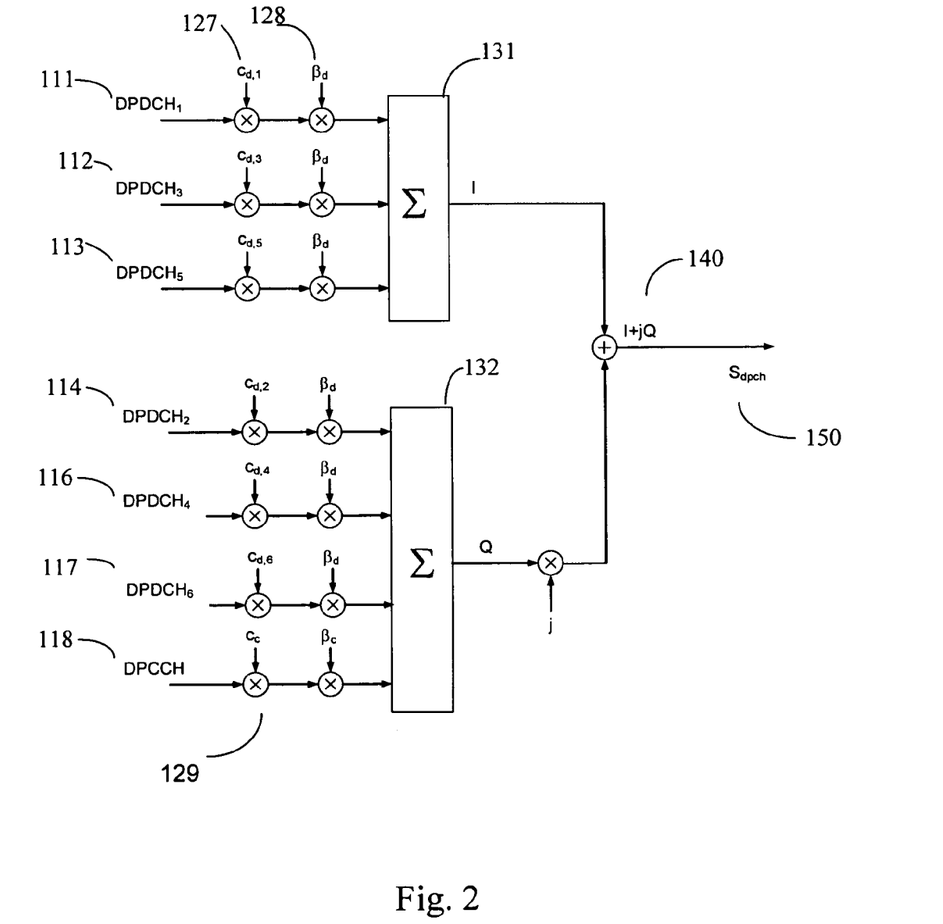
FIG. 2 illustrates an example transmitter circuit portion.

FIG. 2 illustrates an exemplary embodiment of the spreading modules 122, 124, and 126 of FIG. 1 in detail. The DPDCH 102 and the DPCCH 104 portion from FIG. 1 are further described in FIG. 2. The DPDCH 102 only carries circuit (not packet) data and based on the specifications before HSUPA. In FIG. 2, the spreading coefficients $C_d$, i (127 and 129) and the power coefficients $\beta_d$ 128 are illustrated in detail for the uplink channels (111-118). The odd number designated uplink channels (111, 112, and 113), which correspond to the in-phase (I) components of the signal, are processed by a summing module 131 after the spreading operation corresponding to the odd designated spreading coefficients 127 and the power coefficients 128. The even number designated uplink channels (114, 116, and 117), which correspond to the quadrature (Q) components of the signal, and the DPCCH 118 are processed by the summing module 132 after the spreading operation corresponding to the even designated spreading coefficients 129 and the power coefficients 128. The in-phase and quadrature components are summed at a summation module 140, resulting in the DPCH signal 150.

Figure 3:
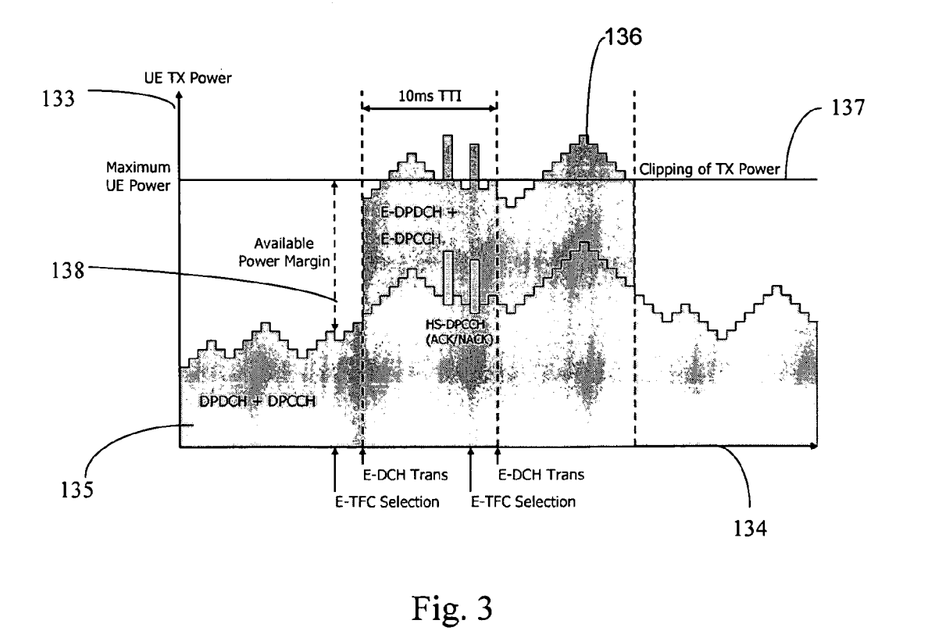
FIG. 3 shows an example power usage diagram.

Because of power control and HS-DPCCH transmission, the UE may run out of power on the E-DPDCH data channel if the E-TFC was not properly selected, or the need for additional power for sending channel quality measurements (CQI) and/or ACK/NACK on the HS-DPCCH, which may result in a waste of transmission resources and increased latency from re-transmission. In HSUPA with a 10 ms TTI, this problem may be severe because transmission power can vary by ±15 dB for 10 ms TTI. FIG. 3 illustrates an power usage diagram, indicating that a UE may run out of power during operation because of an inadequate power margin. The y-axis 133 represents the power used by the UE during transmission intervals for the data and control channels. The x-axis 134 represents the time scale during operation of the UE while the UE is transmitting the data and control channels. The combined DPDCH and DPCCH channel transmission 134 consumes a certain amount of power. The power levels increase in discrete steps, up to 15 db per TTI. A power margin 138 exists between the DPDCH+DPCCH 134 channel power and a maximum UE power level 137. When an E-DPDCH and E-DPCCH channel combination 136 is implemented, the UE may run out of power, resulting in clipping of transmission power when the E-DPDCH and E-DPCCH channel combination 136 exceeds the maximum UE power level 137.

Figure 4:
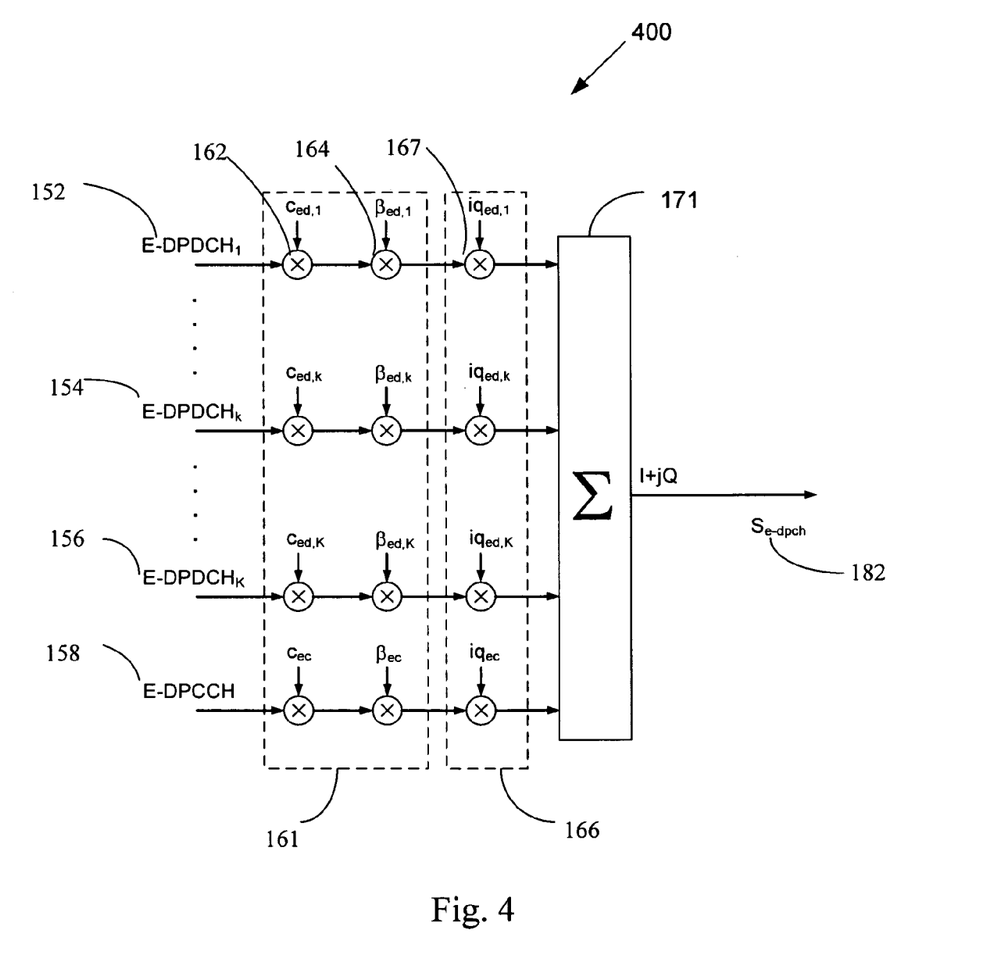
FIG. 4 illustrates an example transmitter circuit portion for E-DPDCH/E-DPCCH channels.

FIG. 4 illustrates a block diagram of an exemplary portion of a transmitter circuit 400. The transmitter circuit portion 400 includes channel inputs, such as the E-DPDCH (152, 154, and 156) and the E-DPCCH 158 channels, a spreading module 161 that generates the spread spectrum signal components, an I/Q module 166, and a summation module 171. The E-DPDCH (152, 154, and 156) and the E-DPCCH 158 are multiplied with the corresponding spreading coefficients (162 and 164) in the spreading module 161, such as described in FIG. 1. The spread spectrum signal components are then multiplied by corresponding I and Q coefficients 167 in the IQ module 166 to generate the I and Q components of the signal. The signals are summed at a summation module 171, to produce an E-DPCH signal $S_{e\text{-}dpch}$ 182.

Figure 5:
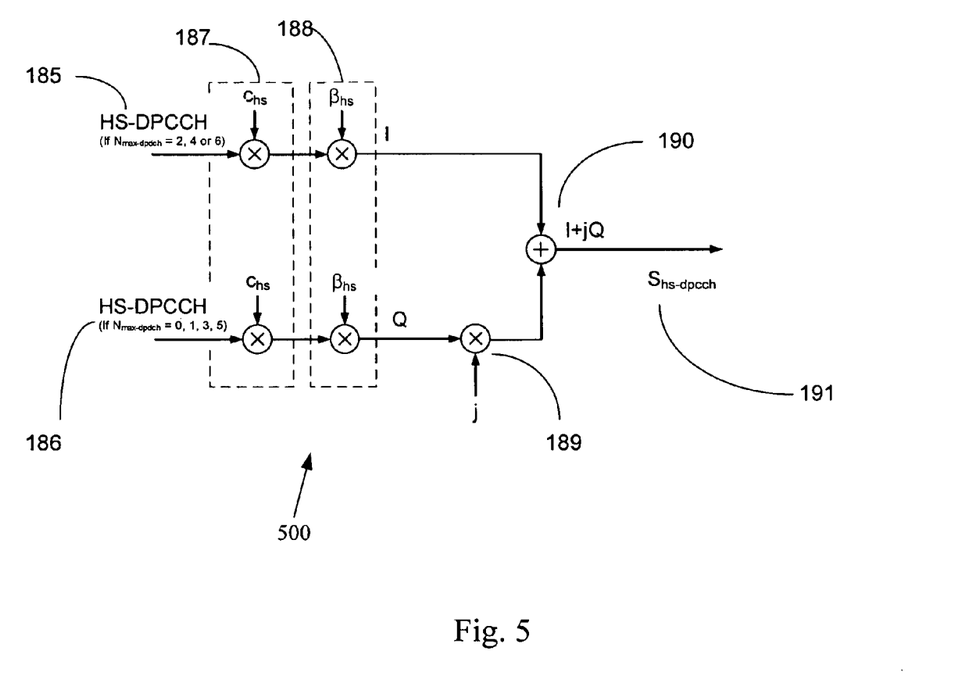
FIG. 5 illustrates spreading for an uplink high speed (HS)-DPCCH.

FIG. 5 illustrates an exemplary HSDPA transmitter circuit portion 500. The HSDPA transmitter circuit portion 500 includes HSDPA channel inputs (185 and 186), a spreading module 187, a power gain module 188, a quadrature multiplier 189, and an I/Q summation module 190. To support HSDPA, an HS-DPCCH (185, 186) channel was introduced. The HS-DPCCH 185 for $N_{max\text{-}dpdch}$ even data channels, is associated with the I components of the signal, and the HS-DPCCH 186 for $N_{max\text{-}dpdch}$ odd data channels, is associated with the Q components of the signal. The HS-DPCCH (185, 186) is processed by multiplying by corresponding spread coefficients 187 at the spreading module 187 and gain coefficients 188 at the power gain module 188. The HS-DPCCH 186 is converted to a quadrature phase component at the quadrature multiplier 189, and the HS-DPCCH 186 and the HS-DPCCH 187 are combined at the I/Q summation module 190 to produce the HS-DPCCH signal $S_{HS\text{-}DPCCH}$ 191.

Figure 6:
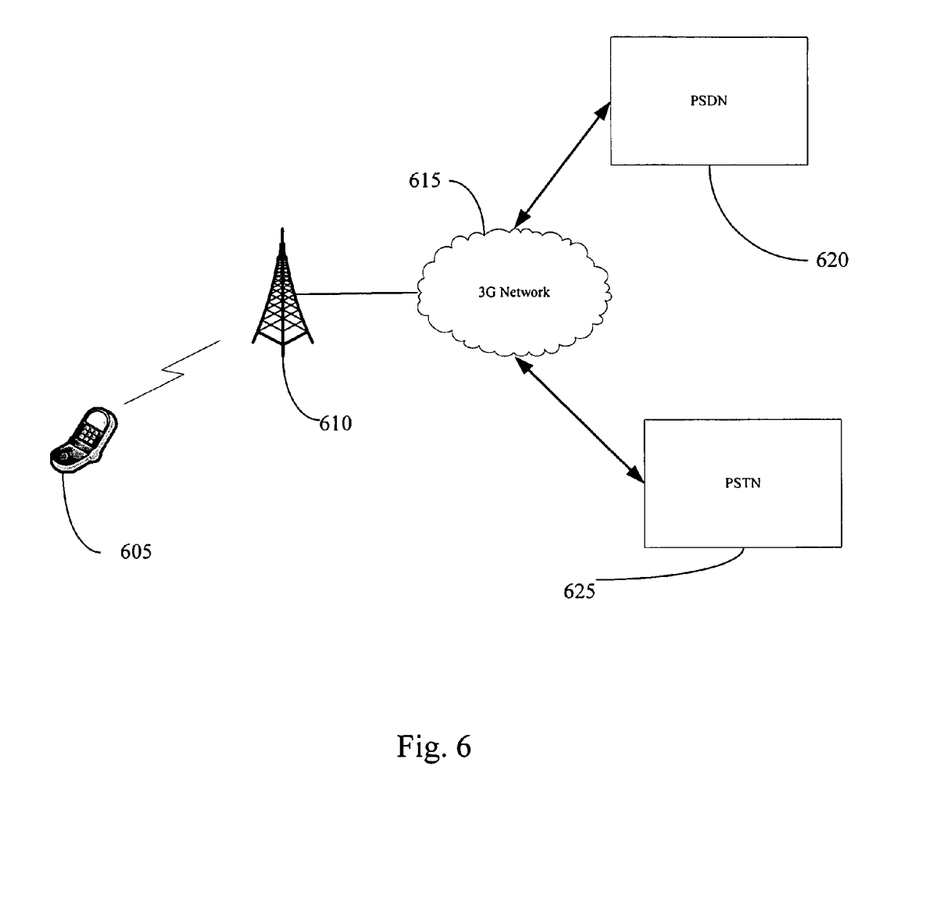
FIG. 6 is a schematic diagram of an example communications network.

FIG. 6 illustrates an example schematic block diagram of a wireless communications network 600, such as a third generation (3G) W-CDMA network. The wireless communications network includes a wireless user equipment (UE) 605, a base transceiver station, such as a Node B 610, a 3G network 615, a Public Switched Data Network (PSDN) 620, and a Public Switched Telephone Network (PSTN) 625.

The wireless UE 605 may be a cellular telephone configured to operate with the W-CDMA protocol. The wireless UE 605 may include other devices that transmit and receive data signals interoperable with the W-CDMA protocol. The Node-B 610 is a term used in UMTS to denote the base transceiver station (BTS). in a 3G network. The Node B 610 contains radio frequency transmitters and receivers used to communicate directly with the wireless UE's 605. In this type of cellular network, the wireless UE's cannot communicate directly with each other but have to communicate with the Node B's 610. The Node B 610 includes signal power measurement modules that are adaptable to determine a signal power value for a received signal from a UE 605. The Node B 610 is configurable to transmit a power control signal to the UE 605 periodically, indicating to the UE 605 whether to increase to decrease its transmit power. The UE 605 utilizes the power control signal to generate a past power control report for use in predicting a channel value in the next TTI.

The 3G network 615 includes components that connect the wireless UE 605 and the Node B 610 with other components, such as the PSDN 620 and the PSTN 625. The 3G network 615 includes support nodes, servers, and gateways operable to transmit the data carried within the 3G network 215 and between the wireless UE 605 and the PSDN 620 and the PSTN 625.

Figure 7:
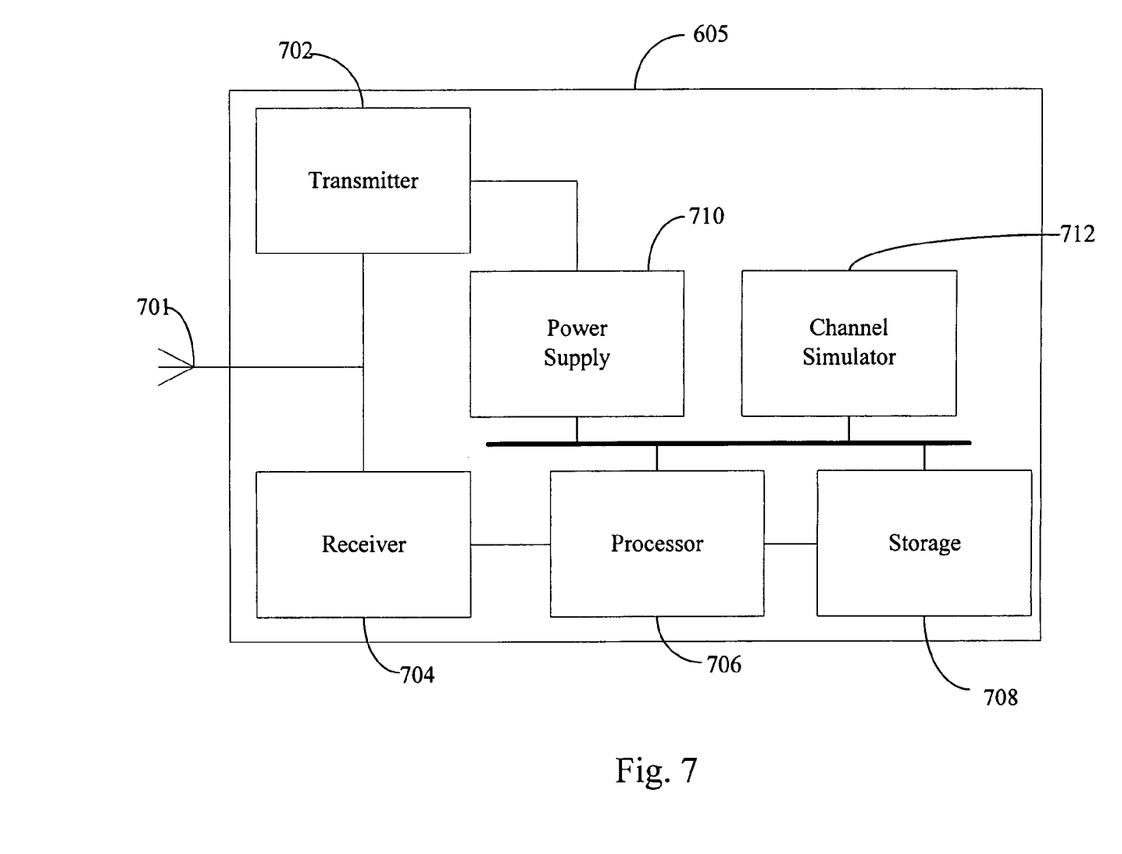
FIG. 7 is a schematic block diagram of an example mobile transceiver unit.

FIG. 7 illustrates a schematic block diagram of an example UE 605. The UE 605 includes an antenna 701, a transmitter 702, a receiver 704, a processor 706, a storage 708, a power supply 710, and a channel simulator 712. In an exemplary embodiment, the antenna 701 may be coupled to both the transmitter 702 and the receiver 704, or the transmitter 702 and the receiver 704 may be connected to respective antenna units. In another exemplary embodiment, the processor 706, the storage 708, the power supply module 710, and the channel simulator 712 are be coupled to each other through a communications bus 714. The communications bus 714 is operable to transmit control and communications signals from and between the components connected to the bus 714, such as power regulation, memory access instructions, channel simulator results and other system information. The processor 706 is coupled to the receiver 704, and the transmitter 702 is coupled to the receiver 704 and to the processor 706.

The processor 706 is configurable to select an E-TFC for HSUPA in 3G wireless communications. To accomplish the E-TFC selection, the processor 706 is configurable to predict a power margin for an acknowledgement transmission based on transmission parameters. Examples of transmission parameters include a past transmission indicator, a service type, a CQI report, or a time since a last transmission. The processor 706 is configurable to reserve a power margin for a CQI transmission, and determine an E-TFC for an uplink data packet transmission based on an available power margin. The processor 706 may also determine an available power margin for a dedicated channel for the next TTI by calculating $P_{MAX}-P_{CHANNEL}-P_{CQI}-P_{ACK}$, where $P_{MAX}$ is a maximum transmission power for a mobile device, $P_{CHANNEL}$ is a predicted power needed to compensate for channel variation, $P_{CQI}$ is a reserved power for a CQI transmission, and $P_{ACK}$ is a predicted power needed for the acknowledgement transmission.

The past transmission indicator may be used to predict a power margin for an acknowledgement transmission. In certain data transmissions, packet arrives in burst rather than in continuous stream. Thus, when a packet data transmission is indicated, another packet transmission may be expected soon after. As a result, a burst of acknowledgments is required in response to the data transmission burst. Hence, knowledge of past transmission indicator can be used to predict future acknowledgement transmission.

Knowledge of the service type may be also used to predict a power margin for an acknowledgement transmission. With certain services, such as Voice over IP (VoIP) or multimedia streaming, contents arrive at a regular time interval. As a result, the need for an acknowledgment may be predicted given knowledge of the arrival time interval.

The CQI report sent on the uplink may be used to predict a power margin for an acknowledgement transmission. With certain scheduling algorithms, data packet transmission may commence immediately or soon after a CQI report is received at the base station. This scheduling is performed to minimize channel mismatch arising from the delay between when the CQI was received and when data transmission occurred. The need for an acknowledgment subsequent to the transmission of a CQI report may be predicted.

With certain scheduling algorithm, data packet transmissions may be initiated to a mobile after a certain length of time since the last data packet transmission. This scheduling is performed to ensure fairness among all users. The need for an acknowledgment may be predicted based on the amount of time since the last data packet transmission.

The processor 706 is further configurable to reserve a fixed margin for transmitting a CQI as needed, when a CQI report is scheduled for transmission. Otherwise the UE 605 may not require a fixed margin for the CQI, to avoid excessive power usage during the next TTI.

The power supply 710 provides power to the components for the UE 605. The power supply 710 is configurable to be controlled by the processor 706 to increase or decrease power to the transmitter 702 by ±1 dB increments, up to 15 dB over a TTI. The power supply 710 may include power conditioning and power filtering components operable to ensure a smooth power signal to the transmitter 702. The storage 708 stores data required for operation of the UE 605, channel initialization parameters, and other data used by the processor 706 for operation under UMTS. The storage 708 may store other data, such as data packets to be transmitted by the UE 605, data packets received by the receiver 704, or buffered data that is retrieved by the processor 706.

Figure 8:
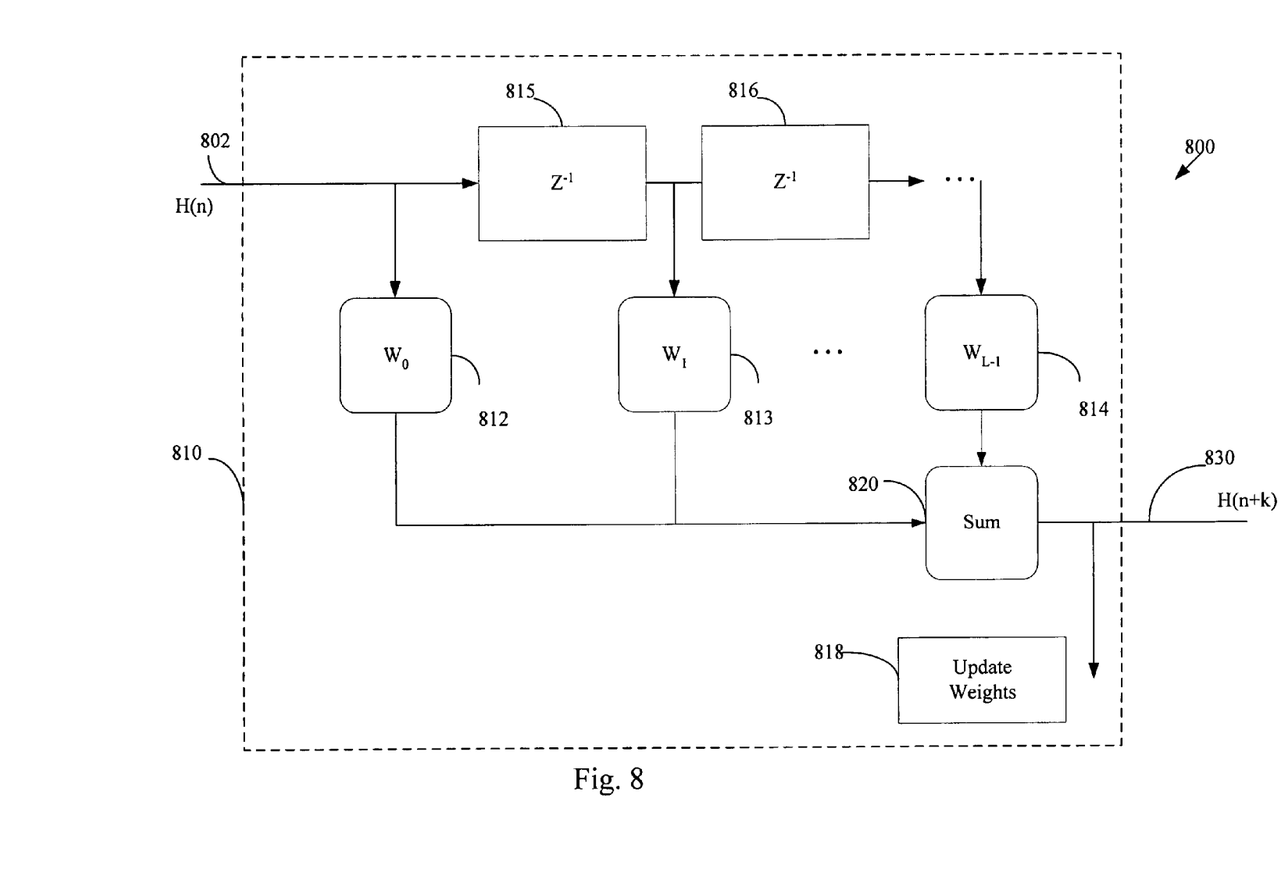
FIG. 8 is a schematic block diagram of an example linear filter for a channel estimator.

The channel simulator 712 is programmable to estimate a power margin of one or more dedicated channels for a next TTI based on determined parameters using a linear filtering operation. FIG. 8 illustrates a schematic block diagram for an example channel power margin estimator 800. The estimator 800 calculates the channel value H(n) 802 based on past power control signals from the Node B 610. The power control signal indicates the past transmission power received at the Node B 610. The channel value 802 is input to a linear filter 810, which has a number L of taps. The L taps include weights 812, 813, and 814 that are multiplied with the last L number of sub-frames of channel value data, and filtered through the appropriate delay modules 815 and 816. The filtered power control signal 802 is summed at summing module 820, according to Eq. 1 below, where $w_i$ includes a weight for an interval i and H(n) is a channel value at a time index n.

$$H(n) = \sum_{i=1}^{L-1} w_i(n) \times H(n-i) \quad \text{(Eq. 1)}$$

The weights 812, 813, and 814 are updated at an update module 822 based on an adaptive recursive least squares filter (RLS) to find the filter coefficients that relate to producing the recursively least squares of the error signal (a difference between a desired and the actual signal). The output from the summing module 820 is then output as the estimated power margin 830 of one or more dedicated channels for the next TTI.

The weights 812, 813, and 814 are updated at an update module 822 based on an adaptive recursive least squares filter (RLS) as follows:

$$w(n) = w(n-1) + k(n)\epsilon^*(n)$$

where the weights $w_i(n)$ of the predictor are given by $$w(n) = [w_0(n)\ w_i(n)\ \ldots\ w_{L-1}(n)]$$

and $$k(n) = \frac{\lambda^{-1} P(n-1) u(n)}{1 + \lambda^{-1} u^H(n) P(n-1) u(n)}$$

$$\epsilon(n) = C\hat{Q}I(n) - CQI(n)$$

with $$P(n) = \lambda^{-1} P(n-1) - \lambda^- k(n) u^H(n) P(n-1)$$

$$u(n) = [H(n-1)\ \ldots\ H(n-L)]$$

where λ is a constant. Because the weights are continuously updated, changes in the underlying propagation statistics (arising from changes in vehicle speed, for example) are automatically handled by the adaptive algorithm. While the weights are being trained, however, their application may lead to unacceptable prediction errors. One criteria for determining convergence is to examine the average squared errors over several updating periods as shown by $$\frac{1}{K}\sum_{i=0}^{K-1}|\varepsilon^2(n-i)| \le \kappa$$

where ϵ(n) is the prediction error and κ is a constant used to determine convergence.

The channel simulator 212 may be incorporated into the processor 206 as a sub-module within the processor 206. The channel simulator 212 may also be implemented as computer executable code, logic, or functions stored by the storage 208 and retrievable and executable by the processor 206. The processor 206 and the channel simulator 212 may be implemented as digital signal processors (DSPs), microprocessors, microcontrollers, application specific integrated circuits (ASICs), field programmable gate arrays (FPGAs) or other integrated circuit devices.

Figure 9:
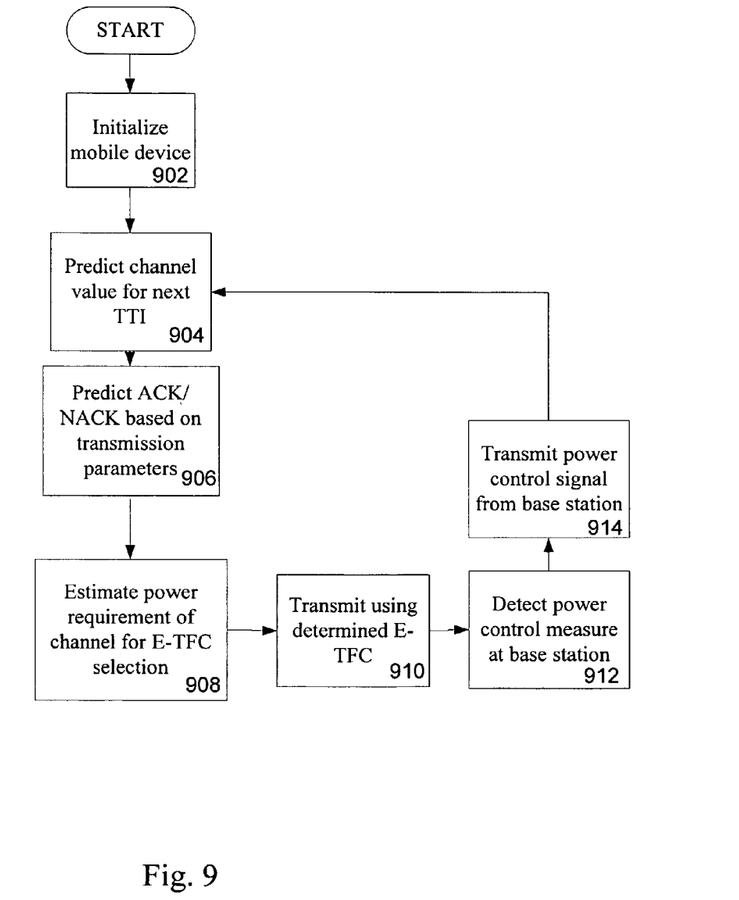
FIG. 9 illustrates an example method for selecting an enhanced transport format combination for a mobile transceiver unit.

FIG. 9 illustrates an example method that selects an E-TFC for HSUPA in 3G wireless communications for a mobile device. A mobile device, such as a UE 605, is initialized, at step 902, for communication in the 3G network 100. Such initialization may include locating the UE 605 in a particular node, determining which Node B 610 communicates with the UE 605, setting initial power transmission parameters, data and/or voice transmission modes, and other initialization settings.

The UE 605 predicts a channel for a next TTI, at step 904. The UE 605 may use a past transmission indicator, a service type, a CQI report, or a time since a last transmission The UE 605 uses the power control signal H(n), as defined in Eq. 1, to estimate a power margin based on past power control reports generated by the Node B 610. The UE 605 utilizes a filtering method as described in relation to FIG. 7 above. The UE 605 may also determine an available power margin by calculating $P_{MAX}-P_{CHANNEL}-P_{CQI}-P_{ACK}$, where $P_{MAX}$ is a maximum transmission power for a mobile device, $P_{CHANNEL}$ is a predicted power needed to compensate for channel variation, $P_{CQI}$ is a reserved power for a CQI transmission, and $P_{ACK}$ is a predicted power needed for the acknowledgement transmission.

The UE 605 then predicts a power margin, at step 906, for an acknowledgement transmission (ACK/NACK) based on transmission parameters, such as a past transmission indicator, a service type, a CQI report, or a time since a last transmission is available for processing. The UE 605 may reserve a fixed margin for transmitting a CQI. The UE 605 may attempt to conserve power by only allocating the fixed margin for a CQI transmission when a CQI transmission is scheduled.

The UE 605 estimates a power requirement of a channel for an E-TFC selection, at step 908. The UE 605 transmits a data signal, at step 910, based on the determined E-TFC. The E-TFC includes data transmission rates and power control measures based on the predicted channel and reserved power margins. The Node B 610 detects a power control measure, such as the transmitted data signal, at step 912, and transmits a power control signal, at step 914, back to the UE 605. The power control signal is based on the received power measurement of the data signal, and includes sub-frame power information to incorporate into the power control signal H(n).

The process repeats at step 904. The UE 605 may store the transmission parameters in the storage 608 for retrieval.

Figure 10:
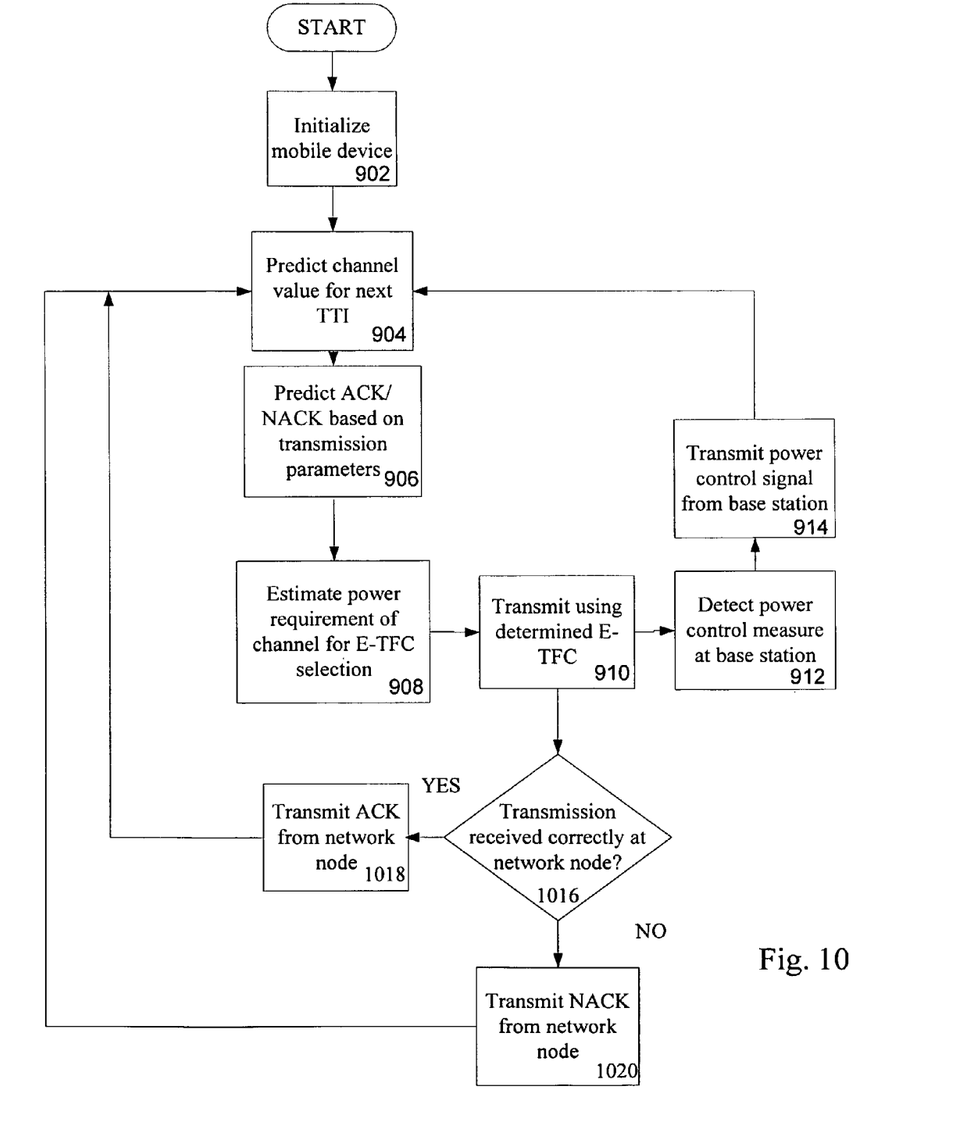
FIG. 10 illustrates an example method for selecting an enhanced transport format combination for a communications network.

FIG. 10 illustrates a method that transmits data for enhanced uplink of HSDPA in 3G wireless communications for a communications network. The method described in FIG. 9 follows the same steps as in the method described in FIG. 9 up to step 910. After the UE 605 transmits a data signal, at step 910, based on the determined E-TFC, the Node B 610 determines, at step 1016, if the data signal is received at the Node B 610. If the data signal is received correctly, the Node B 610 transmits an acknowledgement transmission (ACK), at step 1018, to the UE 605. If a data error occurs as detected by the Node B 610, the Node B 610 may transmit a negative acknowledgement signal (NACK), at step 1020, to indicate that an error was detected in the previously received data signal and that the receiver is ready to accept retransmission of that data signal.

The Node B 610 detects a power control measure, such as the transmitted data signal, at step 912, and transmits a power control signal, at step 914, back to the UE 605. The power control signal is based on the received power measurement of the data signal, and includes sub-frame power information to incorporate into the power control signal H(n).

The process repeats at step 904, where the UE 605 uses the previous transmission parameters. The UE 605 may store the transmission parameters in the storage 608 for retrieval.

With the system disclosed, reserving E-TFC power margin according to the variation in propagation condition and future HS-DPCCH transmission allows just enough power margin to be reserved so as not to exceed the UE's maximum transmit power. This increases throughput (since the packet channel does not run out of power) and lower latency (saving from having to perform re-transmission).

Like the methods shown in FIGS. 9-10, the sequence diagrams may be encoded in a signal bearing medium, a computer readable medium such as a memory, programmed within a device such as one or more integrated circuits, or processed by a controller or a computer. If the methods are performed by software, the software may reside in a memory resident to or interfaced to the UE 605, a communication interface, or any other type of non-volatile or volatile memory interfaced or resident to the UE 605. The memory may include an ordered listing of executable instructions for implementing logical functions. A logical function may be implemented through digital circuitry, through source code, through analog circuitry, or through an analog source such as through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any module that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

It is therefore intended that the foregoing detailed description be regarded as illustrative rather than limiting, and that it be understood that it is the following claims, including all equivalents, that are intended to define the spirit and scope of this invention.

The invention claimed is:

1. A method that selects an Enhanced Transport Format Combination (E-TFC) for High-Speed Uplink Packet Access in a third generation (3G) wireless communications for a mobile device, the method comprising:
    using a channel prediction to estimate a power margin of a one or more dedicated channels;
    predicting a power margin for an acknowledgement transmission based on transmission parameters;
    reserving a power margin for a channel quality indicator (CQI) transmission; and
    determining an E-TFC for an uplink data packet transmission based on an available power margin.

2. The method of claim 1, where the transmission parameters comprise a past transmission indicator, a service type, a CQI report, or a time since a last transmission.

3. The method of claim 1 further comprising determining the available power margin by $P_{MAX}\text{-}P_{CHANNEL}\text{-}P_{CQI}\text{-}P_{ACK}$, where $P_{MAX}$ is a maximum transmission power for a mobile device, $P_{CHANNEL}$ is a predicted power needed to compensate for channel variation, $P_{CQI}$ is a reserved power for a CQI transmission, and $P_{ACK}$ is a predicted power needed for the acknowledgement transmission.

4. The method of claim 1, further comprising reserving a fixed margin for transmitting the channel quality indicator (CQI).

5. The method of claim 2, where reserving the fixed margin comprises reserving the fixed margin based on a scheduled CQI reporting.

6. The method of claim 5, wherein the predicted channel value of the next transmission interval comprises a value H(n) and wherein generating the predicted channel includes generating the predicted channel according to the relation:

$$H(n) = \sum_{i=1}^{L-1} w_i(n) \times H(n-i),$$

where $w_i$ includes a weight for an interval i and H(n) is a channel value at a time index n.

7. The method of claim 1, further comprising using one or more past power control reports to generate a predicted value of the channel in a next transmission interval.

8. The method of claim 7, further comprising receiving the one or more past power control reports from a base station.

9. The communications device of claim 8, where the transmission parameters comprise a past transmission indicator, a service type, a CQI report, or a time since a last transmission.

10. The communications device of claim 8, where the mobile unit is further operable to reserve a fixed margin for transmitting the channel quality indicator (CQI).

11. The communications device of claim 10, where the mobile unit is further operable to use one or more past power control reports to generate a predicted value of the channel in a next transmission interval.

12. The communications device of claim 10 where the mobile unit is further operable to determine an available power margin by $P_{MAX}\text{-}P_{CHANNEL}\text{-}P_{CQI}\text{-}P_{ACK}$, where $P_{MAX}$ is a maximum transmission power for the mobile unit, $P_{CHANNEL}$ is a predicted power needed to compensate for channel variation, $P_{CQI}$ is a reserved power for a CQI transmission, and $P_{ACK}$ is a predicted power needed for the acknowledgement transmission.

13. The communications device of claim 12, where the mobile unit is further operable to receive the one or more past power control reports from a base station.

14. The communications device of claim 10, where the mobile unit is further operable to reserve the fixed margin by reserving the fixed margin based on a scheduled CQI reporting.

15. The communications device of claim 14, wherein the predicted channel value of the next transmission interval comprises a value H(n) and wherein the mobile unit is configurable to generate the predicted channel according to the relation:

$$H(n) = \sum_{i=1}^{L-1} w_i(n) \times H(n-i),$$

where $w_i$ includes a weight for an interval i, and H(n) is a channel value at a time index n.

16. A communications device for enhanced uplink of High-Speed Uplink Packet Access (HSUPA) of 3G wireless communications, the communications device comprising:
    a mobile unit comprising a receiver and a transmitter, where the mobile unit is operable to:
    use a channel prediction to estimate a power margin of a one or more dedicated channels;
    predict a power margin for an acknowledgement transmission based on transmission parameters;
    reserve a power margin for a channel quality indicator (CQI) transmission; and
    determine an Enhanced Transport Format Combination (E-TFC) for an uplink data packet transmission based on an available power margin.

17. A communications network for enhanced uplink of High-Speed Uplink Packet Access (HSUPA) in third generation (3G) wireless communications, the communications network comprising:
    a mobile transceiver unit, where the mobile transceiver unit is operable to:
    use a channel prediction to estimate a power margin of a one or more dedicated channels;
    predict a power margin for an acknowledgement transmission based on transmission parameters;
    reserve a power margin for a channel quality indicator (CQI) transmission; and
    determine an Enhanced Transport Format Combination (E-TFC) for an uplink data packet transmission based on an available power margin; and
    a communications network node operable to transmit a power control signal to the mobile transceiver unit.

18. The communications network of claim 17 where the mobile transceiver unit is further operable to reserve a fixed margin for transmitting the channel quality indicator (CQI).

19. The communications network of claim 17 where the transmission parameters comprise a past transmission indicator, a service type, a CQI report, or a time since a last transmission.

20. The communications network of claim 17, where the mobile transceiver unit is further operable to determine an available power margin by $P_{MAX}-P_{CHANNEL}-P_{CQI}-P_{ACK}$, where $P_{MAX}$ is a maximum transmission power for a mobile device, $P_{CHANNEL}$ is a predicted power needed to compensate for channel variation, $P_{CQI}$ is a reserved power for a CQI transmission, and $P_{ACK}$ is a predicted power needed for the acknowledgement transmission.

21. The communications network of claim 18, where the mobile transceiver unit is further operable to use one or more past power control reports to generate a predicted value of the channel in a next transmission interval.

22. The communications network of claim 21, where mobile transceiver unit is further operable to receive the one or more past power control reports from a base station.

23. A method that transmits data for enhanced uplink of High Speed Downlink Packet Access in third generation (3G) wireless communications for a communications network, the method comprising:
   using a channel prediction to estimate a power requirement of a one or more dedicated channels and maintain a power margin for Enhanced Transport Format Combination (E-TFC) selection;
   using a channel prediction to estimate a power margin of a one or more dedicated channels;
   predicting a power margin for an acknowledgement transmission based on transmission parameters;
   reserving a power margin for a channel quality indicator (CQI) transmission;
   determining an E-TFC for an uplink data packet transmission based on an available power margin;
   transmitting a data signal from a mobile unit based on the determined E-TFC; and
   transmitting a power control signal from a network node based on the data signal.

24. The method of claim 23, further comprising reserving a fixed margin for transmitting the channel quality indicator (CQI).

25. The method of claim 23, where the transmission parameters comprise a past transmission indicator, a service type, a CQI report, or a time since a last transmission.

26. The method of claim 23, further comprising using one or more past power control reports to generate a predicted value of the channel in a next transmission interval.

27. The method of claim 23 further comprising determining an available power margin by $P_{MAX}-P_{CHANNEL}-P_{CQI}-P_{ACK}$, where $P_{MAX}$ is a maximum transmission power for a mobile device, $P_{CHANNEL}$ is a predicted power needed to compensate for channel variation, $P_{CQI}$ is a reserved power for a CQI transmission, and $P_{ACK}$ is a predicted power needed for the acknowledgement transmission.

28. The method of claim 26, further comprising receiving the one or more past power control reports from a base station.

29. The method of claim 24, where reserving the fixed margin comprises reserving the fixed margin based on a scheduled CQI reporting.

* * * * *

UNITED STATES PATENT AND TRADEMARK OFFICE
CERTIFICATE OF CORRECTION

PATENT NO. : 7,599,320 B2
APPLICATION NO. : 11/485899
DATED : October 6, 2009
INVENTOR(S) : Rapeepat Ratasuk et al.

It is certified that error appears in the above-identified patent and that said Letters Patent is hereby corrected as shown below:

In the Claims

In column 9, claim 5, line 37, after "The method of" replace "claim 2" with --claim 4--.

In column 12, claim 24, line 7, before "The method of claim 23" replace "24." with --26.--.

In column 12, claim 25, line 10, before "The method of claim 23" replace "25." with --24.--.

In column 12, claim 26, line 13, before "The method of claim 23" replace "26." with --28.--.

In column 12, claim 27, line 16, before "The method of claim 23" replace "27." with --25.--.

In column 12, claim 28, line 23, before "The method of claim 26" replace "28." with --29.--.

In column 12, claim 28, line 23, after "method of claim" replace "26" with --28--.

In column 12, claim 29, line 25, before "The method of claim 24" replace "29." with --27.--.

In column 12, claim 29, line 25, after "method of claim" replace "24" with --26--.

Signed and Sealed this
Twenty-ninth Day of March, 2011

David J. Kappos
*Director of the United States Patent and Trademark Office*